United States Patent [19]

Voisin

[11] 4,411,813

[45] Oct. 25, 1983

[54] PROCESS FOR EMULSIFYING AND STABILIZING ANISE ESSENCES, ANETHOLE AND ESSENTIAL OILS OR FATS IN THE AQUEOUS PHASE

[76] Inventor: Max Voisin, 23, Rue Fourcroy, 75017 Paris, France

[21] Appl. No.: 268,023

[22] Filed: May 28, 1981

[30] Foreign Application Priority Data

May 30, 1980 [LU] Luxembourg .......................... 82495

[51] Int. Cl.³ ............................................. B01J 13/00
[52] U.S. Cl. ................................... 252/312; 106/208; 252/314; 424/78; 426/590; 426/591; 426/592; 426/651; 426/538
[58] Field of Search ................................ 252/312–314; 424/78; 106/208; 426/590–592, 651, 538

[56] References Cited

U.S. PATENT DOCUMENTS

| | | | |
|---|---|---|---|
| Re. 29,871 | 12/1978 | Papantoniou et al. | 424/78 X |
| 3,622,343 | 11/1971 | Anwar | 252/312 X |
| 3,652,291 | 3/1972 | Bedoukian | 252/312 X |
| 4,059,458 | 11/1977 | Germino et al. | 252/312 X |
| 4,174,296 | 11/1979 | Kass | 252/312 |

OTHER PUBLICATIONS

Pharmaceutical Formulas, vol. 1 12th Edition, 1953, The Chemist and Druggist, London, RS125 P45 1953, pp. 190–194.
Fenaroli's Handbook of Flavor Ingredients, 2nd Ed. 1975, CRC Press, Cleveland, Ohio, vol. I, pp. 278–279, vol. II, pp. 34 & 617.
Arctander, Perfume & Flavor Chemicals, vol. II, 1969, Montclair, N.J., Item No. 236.

*Primary Examiner*—Lucille M. Phynes
*Attorney, Agent, or Firm*—Beveridge, DeGrandi & Kline

[57] ABSTRACT

New process for emulsifying and stabilizing anise essences, anethole and essential oils or fats in the aqueous phase.

The invention relates to a process enabling stable emulsions to be prepared based on essential oils in the aqueous phase using 50 to 100 parts of essential oils and 0.5 to 10 parts of an emulsifying agent and water.

In particular an alcohol-free pastis can be prepared.

15 Claims, No Drawings

PROCESS FOR EMULSIFYING AND STABILIZING ANISE ESSENCES, ANETHOLE AND ESSENTIAL OILS OR FATS IN THE AQUEOUS PHASE

This invention relates to new stable aqueous emulsions of essential oils and the process which enables these emulsions to be obtained.

Stable emulsions of essential oils are generally hard to obtain and are considered possible only in certain polar organic solvents like alcohols, for example. On the other hand, stable concentrated emulsions of essential oils are not known.

The present invention involves such emulsions.

The present invention also involves a process for preparing such emulsions.

The process according to the invention consists basically in the fact that:

in a first stage about 50 to about 100 parts by weight of the essential oil or oils required to be emulsified are mixed with 1 to 10% by weight (0.5 to 10 parts), with respect to the essential oil used, of a suitably chosen emulsifier.

in a second stage the required amount, i.e. about 0.8 to 2 parts by weight per 100 parts of water, of the mixture obtained in the previous stage is put into water and the aqueous mixture is agitated intensively until the emulsion is formed.

According to another version of the process it is possible to incorporate about 50 to about 100 parts by weight of the essential oil or oils beforehand in about 100 parts of vegetable gum along with 10 percent of emulsifier with respect to the essential oil.

If it is particularly difficult to achieve a stable emulsion the intensive agitation of the suspension can be supplemented by an ultrasonic treatment.

By stable emulsion we mean an emulsion which does not break or settle over periods of several weeks or several months.

By aqueous emulsion we mean an emulsion in which the continuous phase is mainly formed (to at least 95% for example) by water.

The vegetable gum which can be used according to the invention may, for example, be gum tragacanth, gum arabic or its different varities, like Senegal, Basra, Galam, Kordofan, Tragasol gums, carob tree gum, agar-agar, alginates, Carragheenin; this list is not restrictive.

The essential oils which can be used according to the invention are chosen from the essential oils used in foodstuffs and cosmetics in accordance with the application in view. For this purpose the following can be quoted: anise essence, orange essence, lemon essence, mandarin essence, bergamot essence, juniper essence, grapefruit essence, citronella essence, ginger essence, cinnamon essence, nutmeg essence, bitter almond essence, clove essence, orange flower essence, rose essence, mace essence, cardamom essence, bitter orange essence, coriander essence, calamus aromaticus essence and lavender essence.

Particularly interesting and remarkable results have been obtained with anethole or anise essences.

The relative quantities of essential oils and emulsifying agent are about 50 g to 100 g of essential oil per 1 to 10 g of emulsifying agent.

The relative quantities of essential oils and gum, when this is used, are about 50 to about 100 g of oil per 100 g of gum.

Not enough oil would generally result in giving an emulsion having properties of little interest and too much oil would result in giving unstable emulsions. It is clearly obvious that the optimum relative quantities of oils, emulsifier and any gum involved depends on the products used and on the properties looked for in the final emulsion.

The emulsifying agents are chosen from amongst those emulsifying agents which are acceptable in foodstuffs. The sugar glycerides (sucroglycerides) can be mentioned in particular like, for example, $C_{16}$–$C_{18}$ fatty acid diesters of saccharose, the sugar esters, the lecithins, the sodium, potassium and calcium salts of the food fatty acids, the polyglyceric esters of the unpolymerized food fatty acids, the propylene glycol monoesters, stearyl-2-lactyl acid and its sodium and calcium salts, stearoyl tartrate and the mono- and diglycerides of the food fatty acids.

In the cosmetics application it is naturally possible to use the above-mentioned emulsifiers along with any other emulsifying agent that is acceptable in cosmetics.

Among the various emulsifying agents those which are especially preferred are selected from lecithin, from which the undesirable elements and impurities have been removed according to known procedures, and preferably a mixture of lecithin and a salt, known for its emulsifying properties, of a fatty acid like palmitic, oleic or stearic acid or a mixture of these acids, propylene glycol monoester, palmitic acid diglyceride, glycerol stearate and the sugar glycerides in general. The percentages of the emulsifying agent to be used are about 1 to about 10% by weight with respect to the weight of the essential oils; it is obvious that the optimum amount of this emulsifying agent will depend on the essential oil being emulsified. The sugar glycerides are especially preferred.

In the process's first stage, and when the essential oil is incorporated into the gum, operations are carried out according to known processes, for example working the gum in the presence of oil in mixer-kneaders. The water in which the oil and the emulsifier, and any gum are introduced is generally ordinary water or exchange treated water. This water may be pure or already contain certain soluble products intended to modify certain properties (for example taste) of the final emulsion like, for example, vanilla oleoresin and glycyrrhizin.

It is also possible to add, notably in the case of aniseed drinks, a so-called "anti-freeze" additive so that crystal formation is prevented if the temperature drops.

Indeed, anethole or the anise essences have a freezing point of 16° to 18° C. depending on purity.

Adding a so-called "anti-freeze" additive which is the object of Luxembourg patent application No. 82480 of 22 May 1980 filed on May 21, 1981 in the U.S.A. under the title "Process for lowering the freezing point of anise essences and anethole by natural products" Ser. No. 265,942 filed May 21, 1981, now U.S. Pat. No. 4,371,559, included by reference, enables the freezing points to be lowered down to −4° C.

Such an anti-freeze additive can be used according to the invention in proportions of 29 to 50% by weight compared to the weight of anethole.

Such an additive consists notably as is described in greater detail in the above-mentioned Luxembourg application in natural products of the terpene and sesquiterpene, aldehyde and ketone groups like organe terpene or limonene with its odour removed by means of vegetable carbon and its wax removed by means of magnesium carbonate.

This additive is added to the anethole with which it mixes before emulsification and does not change the manufacturing process.

The periods during which the "intensive agitation" is performed during the second stage, or during which the "ultrasonic treatment" of the emulsion is carried out, depend on the plant used and on the difficulties encountered in achieving the emulsion; as a first approximation it may be accepted that intensive agitation is performed for a period of around 5 to 20 minutes and that the ultrasounds are applied for a duration of around 10 to 30 minutes.

The process according to the invention can be applied in a wide range of fields and more specifically in cosmetics and in foodstuffs (beverages).

In the cosmetics field it enables perfumes with a high concentration in essential oils to be manufactured like high quality toilet waters and eaux de Cologne with an aqueous base.

In the beverage field it enables soft drinks to be manufactured which are perfectly flavoured with essential oils (anise, mint), the emulsions obtained being concentrated enough to be able to be advantageously diluted with water on use.

It also enables sparkling or sweetened, or both, health drinks to be manufactured, these extracts being capable, furthermore, of being applied to a very wide range of sectors of the food industry.

The process makes it possible, for example, to obtain an alcohol-free anise benefiting from all the taste qualities of alcohol anises without having their physiological shortcomings. In this case this beverage comes in the form of a milky product which distinguishes it from the well-known anise-based alcoholic drinks.

The emulsions obtained by this process possess notably the following advantages:

1. perfect stability over time,
2. compliance with the laws and regulations in force, particularly with the standards of the "service de repression des fraudes" (department for combating fraudulent practices),
3. development and enhancement of tastes, strength and purity of taste,
4. composed of natural products and free of colouring matters and sugar; they can fulfil the requirements of the dietary foodstuffs industry and be consumed by diabetics.

The following non-restrictive examples are intended to illustrate the invention.

EXAMPLE 1

A stable concentrated emulsion of anise in water is prepared.

By kneading, 200 g of essential anise oil and 20 g of lecithin are incorporated into 500 g of gum arabic. The gum obtained in this operation is added to 99 liters of water containing 50 g of glycyrhizza, and this mixture is stirred vigorously by a mixer whose agitator revolves at 1500 rpm; after about 10 minutes an emulsion is obtained which has a stability exceeding 1 year.

If this emulsion is subjected to the action of ultrasound for about 20 minutes the time stability is improved even further.

The above test was repeated but incorporating 350 g of essential oil of anise in 500 g of gum tragacanth and using a mixture of 15 g of lecithin and 10 g of sodium stearate as emulsifying agent; a perfectly stable emulsion is obtained.

EXAMPLE 2

The following emulsion is prepared:
For 100 liters:
Anethole—200 g
Natural anti-freeze additive (deodorized and dewaxed limonene)—1000 cc
Liquorice extract—100 g
Gum arabic—500 g
Lecithin—500 g
Water—99 liters.

The products are incorporated according to the procedure described in example 1 in an emulsifier rotating at 1500 rpm for 10 minutes, and then subjected to the action of ultrasound for 20 minutes.

The freezing point of the alcohol-free anise beverage thus manufactured has been lowered to +2° C.

EXAMPLE 3

The following emulsion is prepared:
(a) for 100 liters:
Lemon essence—50 g
Orange essence—100 g
Vanilla oleoresin—50 g
Propylene glycol monoester—150 g
Sugar—12 g
Water—85 l
Purified gum arabic—100 g.

EXAMPLE 4

The following emulsion is prepared:
Juniper essence—50 g
Lemon essence—50 g
Bergamot essence—25 g
Mandrain essence—25 g
Palmitic acid diglyceride—150 g
Sugar—12 kg
Water—85 l
Gum tragacanth—100 g.

EXAMPLE 5

The following emulsion is prepared:
For 100 liters:
Anise essence—200 g
Natural anti-freeze (of example 2)—100 g
Purified gum arabic—100 g
Glycerol stearate—150 g
Glycyrrhizin—50 g
Water—99.500 l
Freezing point of the anise essence= +2° C.

EXAMPLE 6

The following emulsion is prepared:
For 100 liters:
Anise essence—200 g
Natural anti-freeze (of example 2)13 100 g
Saccharose dioleate—150 g
Glycyrrhizin—50 g
Water—to make up to—100 l This composition is perfectly stable over time and is used as a beverage.

I claim:

1. Stable essential oil emulsions, characterized in that they contain at least:
50 to 100 parts of essential oils,
0.5 to 10 parts at least of an emulsifying agent and water.

2. The emulsion according to claim 1, characterized in that it contains at least 100 parts of vegetable gum.

3. The emulsions according to claims 1 or 2, characterized in that the emulsified whole, i.e. the oils, the emulsifying agent and any gum, amounts to 0.8 to 2 parts per 100 parts of water.

4. The emulsions according to claim 1 or 2 characterized in that the gum is selected from gum tragacanth, gum arabic or the different varieties of gum arabic, carob tree gum, agar-agar, the alginates and carragheenin.

5. The emulsions according to claim 1 or 2 characterized in that the emulsifying agent is lecithin.

6. The emulsions according to claim 1 or 2 characterized in that the emulsifying agent comprises a salt of a fatty acid.

7. The emulsion according to claim 1 or 2 characterized by the fact that the emulsifying agent is a sugar glyceride (sucroglyceride).

8. The emulsions according to claim 1 or 2 characterized by the fact that the essential oil is an essential anise oil and comes in the form of a milky product.

9. The emulsion according to claim 8, characterized by the fact that it contains a natural "anti-freeze" additive based on deodorized and dewaxed natural products permitting the emulsion's freezing point to be lowered.

10. A process for preparing the emulsions according to any of the preceding claims, characterized in that, in a first stage, about 50 to about 100 parts by weight of the oil or oils required to be emulsified and 1 to 10% by weight, with respect to the oil, of at least one emulsifier are mixed together and, in a second stage, 0.8 to 2 parts by weight of the mixture obtained in the preceding stage per 100 parts of water is added to water and the aqueous mixture thus obtained is subjected to intensive agitation until the emulsion is achieved.

11. The process according to claim 10, characterized in that the process is completed by subjecting the emulsion obtained to treatment by ultrasound.

12. The process according to claim 10, characterized in that the said essential oil is incorporated into 100 parts of vegetable gum and 1 to 10% of emulsifying agent with respect to the essential oil.

13. A stable emulsion without sugar comprising (1) an essential oil which is anise, anethole or a mixture thereof and emulsifying means, said emulsifying means being acceptable in foodstuffs and (2) water, the relative amount of essential oil and emulsifying means is about 50 grams to 100 grams of essential oil per 1 to 10 grams of emulsifying means.

14. The emulsion according to claim 13 wherein a vegetable gum is present in the emulsifying means.

15. The emulsion according to claim 13 wherein the relative quantities of essential oil and gum when it is used are about 50 to 100 grams of oil per 100 grams of gum.

* * * * *